(12) United States Patent
Kuznetsov et al.

(10) Patent No.: US 8,670,021 B2
(45) Date of Patent: Mar. 11, 2014

(54) METHOD FOR STAND OFF INSPECTION OF TARGET IN MONITORED SPACE

(75) Inventors: Andrey Kuznetsov, St. Petersburg (RU); Igor Gorshkov, St. Petersburg (RU); Valery Averyanov, St. Petersburg (RU)

(73) Assignee: APSTEC Systems Ltd, Valetta (MT)

( * ) Notice: Subject to any disclaimer, the term of this patent is extended or adjusted under 35 U.S.C. 154(b) by 0 days.

(21) Appl. No.: 13/403,256

(22) Filed: Feb. 23, 2012

(65) Prior Publication Data
US 2013/0022237 A1    Jan. 24, 2013

Related U.S. Application Data

(63) Continuation-in-part of application No. 13/120,857, filed on Jul. 19, 2011, now Pat. No. 8,159,534.

(51) Int. Cl.
*H04N 15/00*    (2006.01)
*H04N 13/00*    (2006.01)

(52) U.S. Cl.
USPC .......................................................... 348/43

(58) Field of Classification Search
None
See application file for complete search history.

(56) References Cited

U.S. PATENT DOCUMENTS

| | | | | |
|---|---|---|---|---|
| 6,243,036 | B1* | 6/2001 | Chadwick et al. | 342/27 |
| 6,573,855 | B1* | 6/2003 | Hayakawa et al. | 342/22 |
| 2005/0270373 | A1* | 12/2005 | Trela | 348/143 |
| 2008/0211711 | A1* | 9/2008 | Mostov et al. | 342/179 |
| 2008/0212742 | A1* | 9/2008 | Hughes | 378/98.12 |

* cited by examiner

*Primary Examiner* — Chikaodilie E Anyikire
(74) *Attorney, Agent, or Firm* — Nadya Reingand

(57) ABSTRACT

This invention addresses remote inspection of target in monitored space. A three dimensional (3D) microwave image of the space is obtained using at least two emitters. The data undergoes coherent processing to obtain maximum intensity of the objects in the area. This image is combined with a 3D video image obtained using two or more video cameras synchronized with the microwave emitters. The images are converted into digital format and transferred into one coordinate system. The distance l is determined between the microwave and the video image. If $l < l_o$, where $l_o$ is a given threshold, the absence of a concealed dielectric object at the target is indicated. If $l > l_o$ then the presence of cavities is analyzed. If the cavity depth h is greater than the threshold value $h_o$ a concealed dielectric object at the target is ascertained:

$$h_0 = l_0 \frac{\sqrt{\varepsilon} - 1}{\sqrt{\varepsilon}}$$

where $\varepsilon$ is dielectric permeability of the sought dielectric object.

18 Claims, 3 Drawing Sheets

METHOD FOR STAND OFF INSPECTION OF TARGET IN MONITORED SPACE

CROSS-REFERENCE TO RELATED APPLICATIONS

This application is a Continuation-in-part of U.S. patent application Ser. No. 13/120,857 filed Jul. 19, 2011 now U.S. Pat. No. 8,159,534.

FIELD OF THE INVENTION

This invention belongs to the field of remote detection of hidden objects, particularly to methods for detection of dielectric explosive substances concealed under clothes on the human body. Foremost among the primary safety and security concerns is the "suicide bomber", who is carrying a bomb on his/her body.

BACKGROUND OF THE INVENTION

Currently, various methods are being used to combat this concern. Some of which include: metal detectors, vapor detectors, X-ray machines, and dogs. Many countries are putting forth great effort in developing new methods for inspection of the human body based on new physical principles: Nuclear Quadrupole Resonance (NQR), Raman backscattering, dielectric portals, passive and active terahertz range devices, passive millimeter range radars and active microwave portals.

The aforementioned methods do not guarantee the required effectiveness of remote and covert inspection, thus, these devices are not capable to detect a "suicide bomber" in adequate time so that the necessary precautions can be taken before detonation of the explosive device. Another notable disadvantage of the currently used methods is non-automatic determination of the threat level of the detected object in addition to the high false alarms' rate. These obstacles make it nearly impossible to use these devices for inspection of a large number of people moving in transit.

Hence, the task of detecting explosive devices being carried by "suicide bombers" should allow for the following provisions:
  Remote inspection;
  Automatic inspection;
  Detection of various types of objects (dielectric/metal objects);
  Detection in real time;
  Automatic system determining threat level of the detected object;
  Covert inspection;
  Independence of external conditions;
  Safety for human health;
  Possibility to bind data and threat signal for a specific individual;
  Mobility and relatively low cost There is a current method of detection used for metallic and non-metallic explosive devices being concealed on a person. In this method, the receiving antenna focuses on a small area of the human body using electromagnetic waves coming from that region. A radiometer data is then processed in a processing module, and the intensity and the position of the beam is recorded. The measured intensity of the received signal is then displayed as luminous intensity. By analyzing the distribution of the luminous intensity, the presence or absence of metallic or non-metallic objects can be determined, see, for example, Russian Federation Patent No. RU2133971.

The main disadvantage of this method is the low contrast of the received image. This method cannot clearly distinguish non-metallic objects from the human body while the dielectric for the used wave range is transparent.

A second method of target remote inspection in monitored space is to irradiate the inspected area with microwaves using two or more elemental emitters. In this method, a register signal is reflected from the monitored area using one or more parallel recording channels. Coherent processing of the reflected signal occurs and the data received is displayed, see, for example, U.S. Pat. No. 5,557,283.

Emitters and receivers of an electromagnetic field are placed in multiple predetermined positions. The final determination is made after analyzing a three-dimensional image received after digital processing of the radiation is recorded in broadband.

This method uses microwaves for irradiation of a monitored area in frequency bandwidth without correlating its width with radial space resolution of the monitored area image and recording the time interval during which coherent processing of the received reflected signal is possible. This brings on the following disadvantages:

The method cannot be used to inspect a moving object/target. When an object is moving in space during the recording of the reflected signal, the position of the object against the emitting/receiving antennas changes thus making it impossible to use coherent processing of the recorded signal. Non-coherent processing results in low resolution imaging if the direction of movement of the inspected object is unknown. Thus, covert inspection is not possible.

Low resolution imaging cannot be analyzed to obtain quantitative data about the dielectric permeability of objects (parts of the target) and their equivalent mass.

Another method for remote inspection of a target in monitored space includes irradiation of the monitored area with microwaves using two or more elemental microwave emitters and recording the reflected signal from the monitored area using one or more parallel recording channels. Coherent processing of the recorded signal to receive maximal intensity values of restored configuration of scattering objects in the monitored area is dependent upon the distance from the elemental emitters to the target. A display of the information is obtained after processing by reconstructing a microwave image as several three-dimensional surfaces, see Russian Federation Patent No. RU 2294549. The aforementioned technical solution was used as a prototype for the proposed invention.

The main disadvantages of the technical solution which was used as a prototype for the proposed invention are:

Low intensity of the signal reflected from an "air-dielectric" border—about 7% of intensity for dielectrics with dielectric permeability~3 (which is typical for explosives). Thus, the signal reflected from the "dielectric-body" border (~90% of intensity) could drastically distort the three-dimensional surface representing the "air-dielectric" border which leads to errors when determining the presence of explosive material.

Only a small range of microwave radiation incidence and receiving angles in which radiation reflected from the "air-dielectric" border can actually be recorded. Usually this is due to the fact that the dielectric's surface tends to be rather smooth, when compared to the wave length of microwave range and scattering on the border takes the form of mirror reflection. Therefore, this method of inspection is useful only in a very small range of possible angles of inspection.

There is a need in improvement the detection accuracy and reliability.

SUMMARY OF THE INVENTION

A system and a method are disclosed to unveil a hidden dielectric object in an interrogated area. It allows visualizing hidden explosives, such as suicide bombs, in a crowd of moving people.

The method comprises obtaining 3D microwave and 3D optical range images of the scene at the same time moment and compare them. Both 3D images are transferred into a common coordinate system, and a decision on an absence of hidden dielectric object is made after determining a distance between the 3D microwave and the 3D optical image. If the distance is less than a threshold value, then there is no hidden explosives. If it is larger than the threshold value, then the presence of cavities is determined. If the cavities' depth h is greater than a depth threshold $h_0 = l_0(\epsilon^{1/2}-1)/\epsilon^{1/2}$, wherein $\epsilon$ is dielectric permeability of the dielectric object.

In order to form the 3D mw image, at least two microwave (mw) sources and at least one mw receivers are used. In the preferred embodiment the object is illuminated by 256 mw emitters and the images are recoded using two mw receivers. Each emitter has up to 30 GHz spectrum. In the preferred embodiment, the receiver is a broadband Vivaldi antenna.

The optical images are recorded at the same time by at least two video cameras.

DETAILED DESCRIPTION

The primary tasks of the proposed invention are to increase the accuracy of determination for the presence/absence of dielectric objects during covert inspection and to enlarge the range of possible views of inspection.

Figure 1:
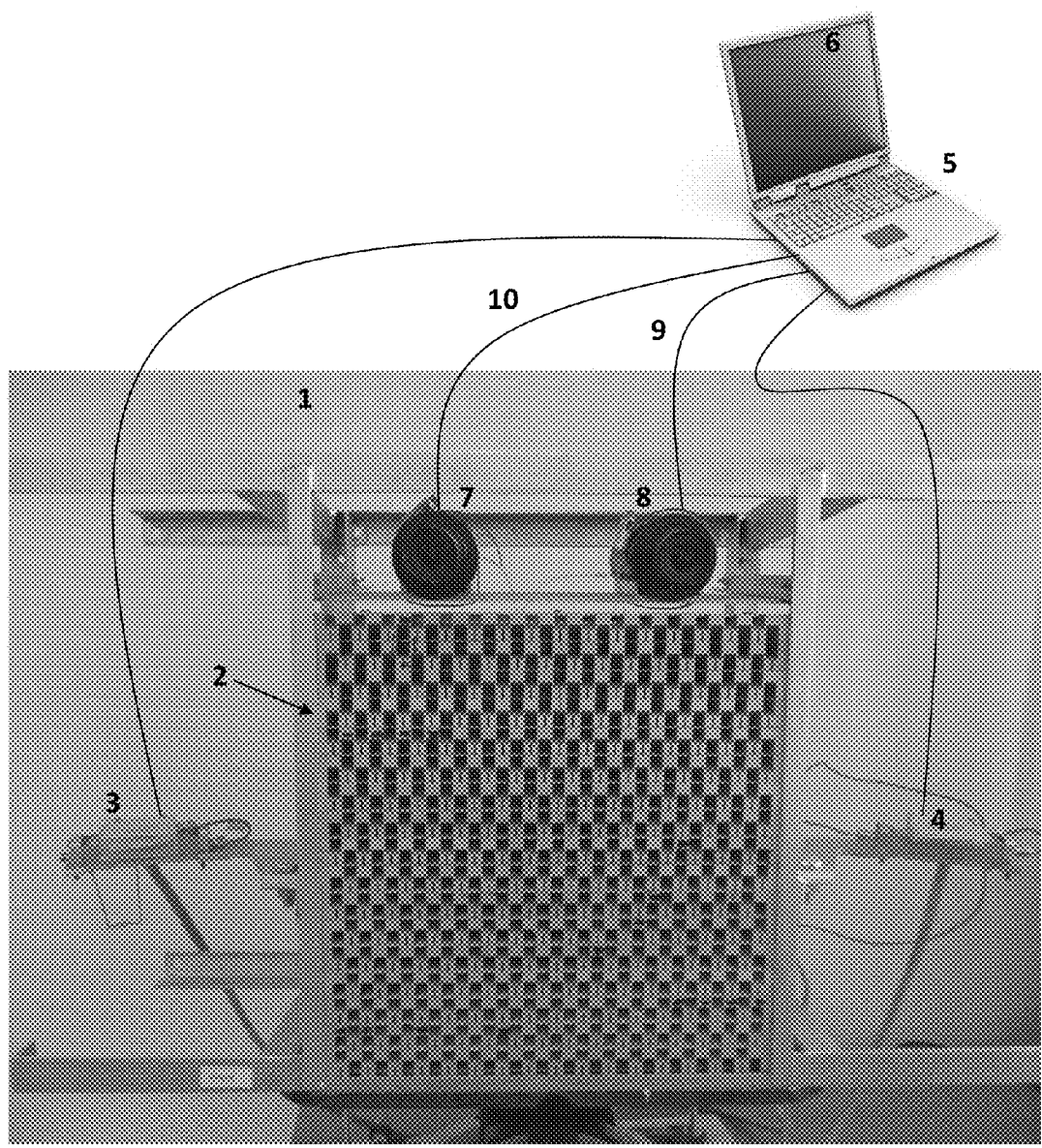
FIG. 1 shows one embodiment of the setup for suicide bomb detection.

One embodiment of a setup 1 for stand off inspection of a target in monitored space is shown in FIG. 1. The space is scanned with microwave radiation using two or more elemental microwave emitters 2. The signal reflected from the monitored area is picked up by one or more parallel detection channels 3 and 4. The received signal undergoes coherent processing in digital signal processing unit (DSP) 5 to obtain maximum intensity values of the restored configuration of scattering objects in the monitored area, depending on the distance from the elemental emitters to the target. The information obtained after processing is then displayed on the display 6 by constructing a microwave image corresponding to a three-dimensional surface. A video image of the target is also obtained using two or more video cameras 7 and 8 which are synchronized with the microwave emitters 2 via the processing unit 5. The obtained video images are transmitted via channels 9 and 10 into the processing unit and are further converted to its digital form, and a three-dimensional image of the target is constructed and displayed on the display 6. The three-dimensional video image and the microwave image are then transferred into a general coordinate system. When you are looking at the system 1 at FIG. 1, you are in the position of the person, who is monitored. The mutual positioning of the microwave image (thin line) and the video image (thick line) is shown in FIG. 2.

Figure 2:
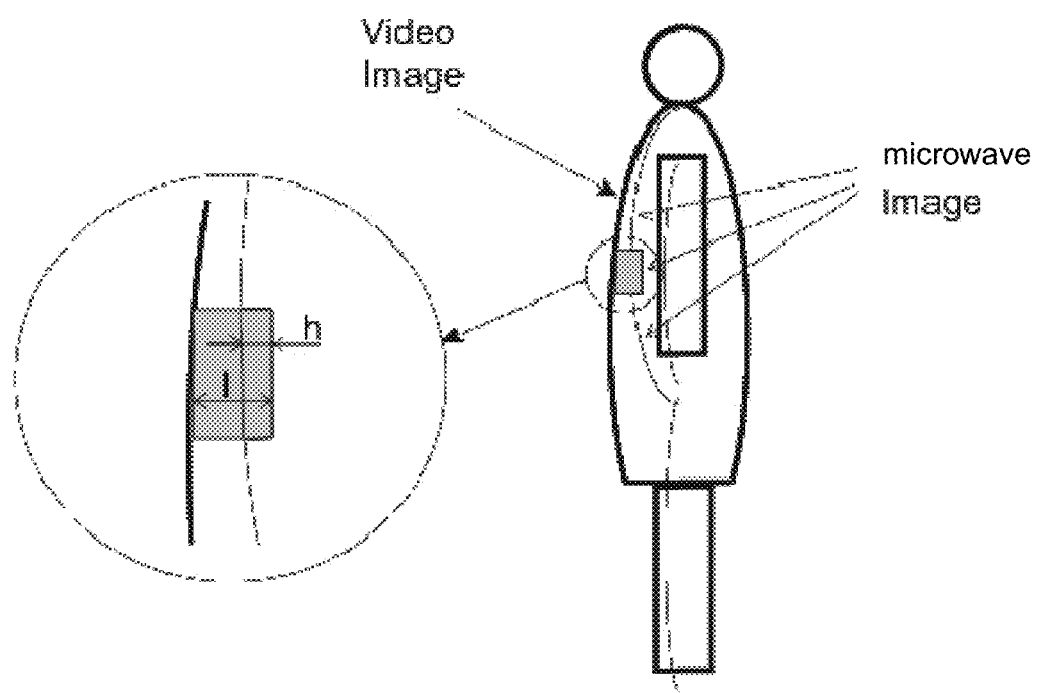
FIG. 2 illustrates the overlapping of the microwave and video images.

FIG. 2 shows the distance l in the general coordinate system between the microwave image and the video image. If l<lo, where lo is a given threshold value of l, this indicates the absence of a concealed dielectric object at the target, in an amount which exceeds the maximum allowable value. If l>lo, there is further determination of the presence of cavities in the three-dimensional microwave image in regions where l>lo and when the depth h of the cavity is greater than $h_0$, then the presence of a concealed dielectric object at the target is ascertained.

$$h_0 = l_0 \frac{\sqrt{\varepsilon} - 1}{\sqrt{\varepsilon}}$$

where $h_0$ is the threshold value of h, $\epsilon$—is dielectric permeability of the sought dielectric object.

This approach provides essential improvements to the device compared with the prior art. Distortions of the three-dimensional surface representing physical "air-dielectric" borders are corrected, which decreases possibility of errors when determining the presence/absence of an explosive.

Additional usage of the three-dimensional video image enlarges the range of possible angles of inspection.

Realization of the method could be best illustrated with an example. To carry out stand off inspection of the target in a monitored area, the area is irradiated by microwave radiation successively at 14 equidistant frequencies in the range 8-12 GHz. In another embodiment the radiation spectrum was up to 30 GHz. The set of frequencies is more beneficial for the irradiation, since it broadens the spectrum of probe radiation. The system longitudinal resolution depends on the width of the irradiation spectrum. In our case this resolution was 150 mm divided by the width of the spectrum in GHz. The equidistant frequencies do not serve the purpose of selective interaction with the substances. In one embodiment, the source of the radiation is a matrix of elemental emitters, a switched antenna array consisting of 256 emitting antennas as shown in FIG. 1. The signal reflected from the monitored area is then recorded by two parallel channels including two broadband Vivaldi antennas and two receivers. In another embodiment, the system includes 1024 emitters and four or eight receivers. From receivers' outputs, data about the recorded signal is transferred onto a PC where coherent processing is performed. The coherent processing includes phase calibration of the receiving channels and further processing of the received signals taking into account the signal phases. Alternatively, incoherent processing may be used, when the intensities of the signals are measured and processed. As the result, an image of the target is made as of one single, three-dimensional surface consisting of points which correspond to maximum values of restored configuration of scattering objects in the monitored area depending on the distance from the elemental emitters to the target.

In one embodiment, the 3D microwave image is formed by calculating the electromagnetic field maxima in the space in front of the emitters. If the emitter matrix coincides with X-Y plane, the processing determines the distribution of magnitudes of the EM field for each X and Y along the coordinate Z, where is perpendicular to the X-Y plane. The maxima correspond to the presence of a reflector—either human body or a metal surface.

Simultaneously, two additional video cameras (in our experiment two digital spatially separated SDU-415 video cameras synchronized with microwave emitters were used) recorded video images of the target, the images were then digitized. The three-dimensional video image of the target is reconstructed on a PC and is later converted into a general system of coordinates common to the video image and microwave image. Video 3D image shows the surface of the person's clothing, while microwave image corresponds to the human body and also may indicate hidden objects. The system of coordinates is set by the antenna array's plane and is perpendicular to its center. The distance l in the general coordinate system, between the microwave image and the video image is determined (FIG. 2). If l<lo, where lo is a given threshold value of l, this indicates the absence of a concealed dielectric object at the target, in an amount which exceeds the maximum allowable value. If l>lo, there is further determination of the presence of cavities in the three-dimensional microwave image in regions where l>lo and when the depth h of the cavity is greater than $$h_0 = l_0 \frac{\sqrt{\varepsilon} 1}{\sqrt{\varepsilon}}$$

where $h_o$ is the threshold value of h, $\in$—is dielectric permeability of the sought dielectric object. Most frequently-used explosives have a dielectric permeability of $\in \approx 3$.

Since the three-dimensional image of the "air-dielectric" and "dielectric-body" borders are reconstructed using different physical principles ("air-dielectric" border image is reconstructed using video data, "dielectric-body" border image is reconstructed using received microwave signal), distortion of the "air-dielectric" border by reflected microwave signal is removed. This also minimizes possible errors when determining the presence/absence of an explosive substance.

Moreover, since microwave radiation is not used to reconstruct the "air-dielectric" border, the smoothness of the dielectric surface has no effect and the possible angles of inspection are greater.

Figure 3:
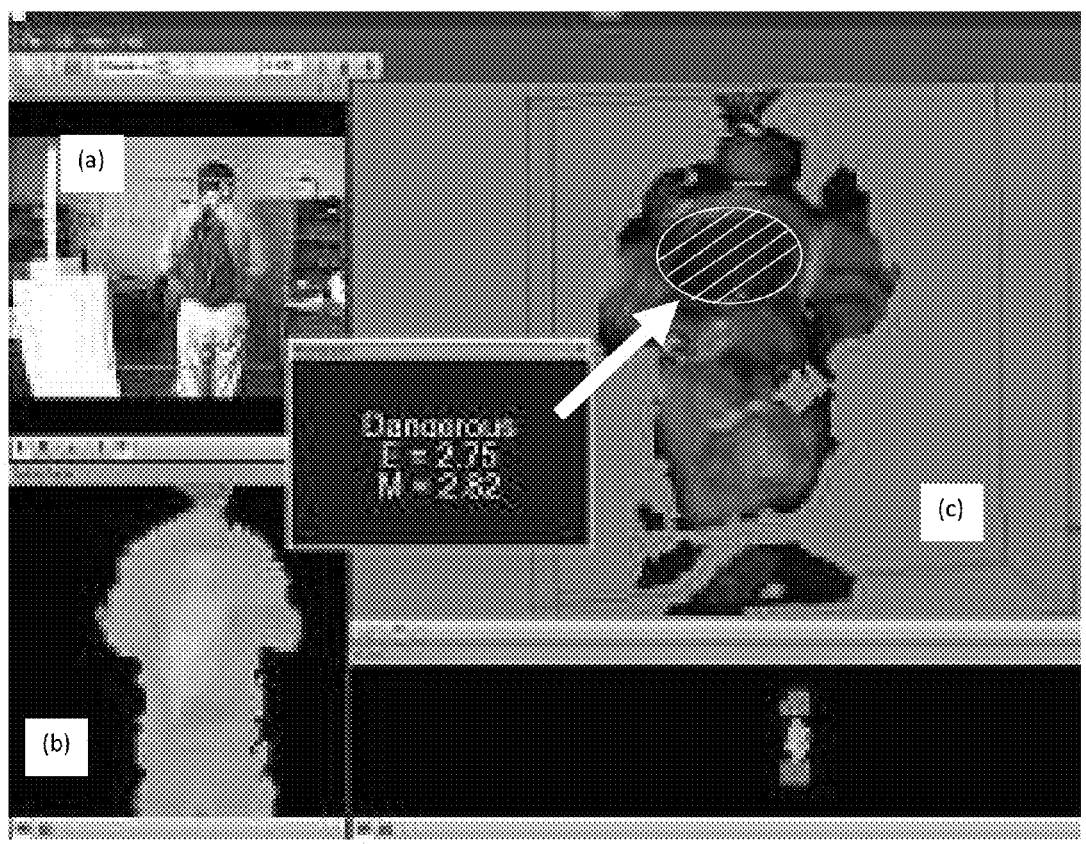
FIG. 3 Experimental results showing hidden explosives in the backpack of a person.

FIG. 3 shows experimental results. Left upper corner photo (a) demonstrates video image of a person with a hidden explosives in the backpack. Lower left corner (b) represents microwave image. And section (c) shows the processing results indicating the suspicious object (hatched area) in the person's backpack.

While embodiment of the present invention has been described above, it should be understood that it has been presented by way of example only, and not limitation. Thus, the breadth and scope of the present invention should not be limited by the above-described exemplary embodiment, but should be defined only in accordance with the following claims and their equivalents.

The previous description of the preferred embodiment is provided to enable any person skilled in the art to make or use the present invention. While the invention has been particularly shown and described with reference to preferred embodiment thereof, it will be understood by those skilled in the art that various changes in form and details may be made therein without departing from the spirit and scope of the invention.

What is claimed is:

1. A method for unveiling hidden dielectric objects in an interrogated area, comprising:
    recording a 3D microwave and a 3D optical range images of an interrogated scene at the same time moment, digitizing all images and overlapping them in one common coordinate system; determining a distance between the 3D microwave and 3D optical images, and concluding the absence of hidden dielectric object where the optical distance is less than a threshold value, the distance being determined via calculating a dielectric permittivity constant $\in$; further comprising concluding the presence of hidden dielectric objects if cavities are observed in the three-dimensional microwave image, where the distance is more than a threshold value l, and the cavities depth h is greater than a depth threshold $$h_0 = l_0(\in^{1/2} - 1)/\in^{1/2}).$$

2. The method of claim 1, wherein $\in$ is about 3.

3. The method of claim 1, wherein the hidden objects are explosive materials or components of thereof.

4. The method of claim 1, wherein the 3D microwave image is formed by illumination of the scene by microwave radiation and recording the scene image by at least two microwave detectors.

5. The method of claim 4, wherein the microwave images are formed by irradiating the area by at least two separate microwave emitters that illuminate the scene from different angles.

6. The method of claim 4, wherein at least two microwave emitters irradiate the area sequentially.

7. The method of claim 4, wherein the microwave emitters scan the area thus forming the images.

8. The method of claim 4, wherein at least two microwave emitters have a spectrum consisted of multiple frequencies.

9. The method of claim 8, wherein the frequencies are equidistant.

10. The method of claim 9, wherein the two microwave emitters have the spectrum up to 30 GHz each.

11. The method of claim 4, wherein the microwave images are formed by irradiating the area by 256 elemental microwave emitters.

12. The method of claim 1, wherein the 3D optical image is formed by illumination of the scene by optical radiation and recording the scene image by at least two optical detectors.

13. The method of claim 1, wherein a digital signal processor (DSP) performs a coherent processing, which calculates the 3D image taking into account both amplitude and phase information of electromagnetic fields reflected from the interrogated scene.

14. The method of claim 1, wherein the interrogated scene is changing in time, and the 3D microwave and 3D optical range images correspond to the same moment of moving scene.

15. The method of claim 14, wherein the method is used to unveil hidden suicide bombs in the crowd of moving people.

16. A system to unveil a hidden dielectric object in an interrogated area, comprising: at least two microwave (mw) sources and at least one mw receiver forming mw images of the interrogated area; at least two optical range cameras recording the interrogated area; a digital signal processor (DSP) receiving the microwave and optical images recorded at the same time and forming a three-dimensional (3D) mw image and a 3D optical image of the interrogated area, both 3D images are transferred into a common coordinate system and overlapped, and wherein a decision on an absence of hidden dielectric object is made after determining an optical distance between the 3D microwave and the 3D optical image, the distance being determined via calculating a dielectric permittivity constant $\in$, and the distance is less than a threshold value, further comprising wherein the presence of hidden dielectric objects is concluded if the distance is more than a threshold value $l_0$, and cavities are observed in the three-dimensional microwave image in areas, where the distance is more than a threshold value $l_0$, and the cavities' depth h is greater than a depth threshold $h_0 = l_0(\epsilon^{1/2}-1)/(\epsilon^{1/2})$.

17. The system of claim 16, wherein the mw receiver includes a broadband Vivaldi antenna.

18. The system of claim 16, wherein the dielectric object is made of an explosive material or components of thereof.

* * * * *